Figure 1:
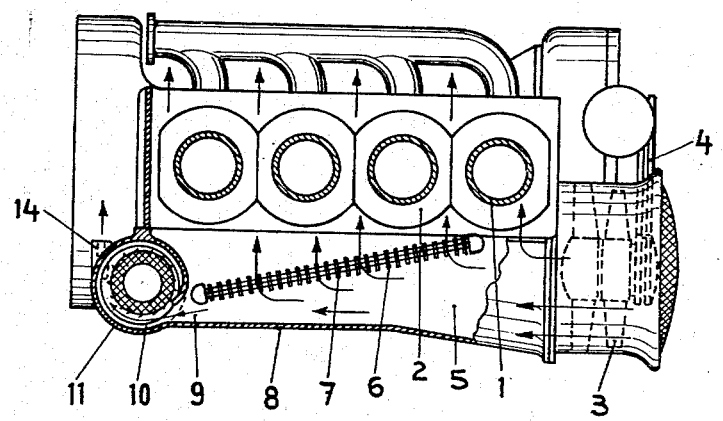

Aug. 31, 1954  K. SONDEREGGER  2,687,782
AIR FILTER FOR INTERNAL-COMBUSTION ENGINES
Filed Aug. 3, 1951

INVENTOR.
KONRAD SONDEREGGER
BY
ATTORNEY

Patented Aug. 31, 1954

2,687,782

UNITED STATES PATENT OFFICE 2,687,782

AIR FILTER FOR INTERNAL-COMBUSTION ENGINES

Konrad Sonderegger, Winterthur, Switzerland, assignor to Schweizerische Lokomotiv- und Maschinenfabrik, Winterthur, Switzerland Application August 3, 1951, Serial No. 240,155

Claims priority, application Switzerland September 12, 1950

3 Claims. (Cl. 183—67)

This invention relates to air filters for internal combustion engines, and more particularly to the cyclone type of filters which have a tangentially disposed air inlet at one end thereof and an axially disposed cleansed air outlet.

It is an object of the invention so to construct air filters of the cyclone type that their efficiency and certainty of operation is unaffected by the position in which the filter is used while simultaneously keeping the space requirements to a minimum.

A further object is to provide a cyclone type air filter having a high capacity of flow of cleansed air and a high degree of separation of the impurities therefrom during the air flow through the filter.

Still a further object is to provide such an air filter requiring a minimum of maintenance attention and replacement of contaminated filter elements and substantially eliminating periodical emptying of the removed dust.

Still a further object is to provide an air filter employing the cyclone principle for the major cleansing and a fine mesh mechanical filter for residual cleaning.

Another object is to provide an air filter on the cyclone principle in which the dust particles removed are continuously and automatically removed and ejected.

As is known, the various and to some extent mutually opposing, requirements are but partially attainable with air filters of prior known construction. Thus, the prior known air filters employing an oil bath through which the input air passes into a cyclone chamber, and having filter cells for increasing the dust ejection, have the disadvantages that they operate efficiently only when used in the normal vertical position, and if they are made compact there is considerable difficulty in separating out the oil drops which are carried along after the passage through the oil bath. With prior known dry cyclone filters in which the air to be cleansed is drawn into the filter housing tangentially, the dust particles are thrown by the vortex formed within the housing against the housing walls and fall through an outlet funnel into a dust collector positioned below the housing, and the dust collector must be periodically removed and emptied. In an improved prior known dry cyclone filter it has been proposed, to prevent the formation of useless and disturbing eddies in the upper portion of the filter housing, to dispose within the housing a helically shaped and downwardly directed gutter to entrap the ejected dust particles, which then having passed out of the endangered zone fall into the hopper of the dust collector. Notwithstanding such improvement, various prior known dry cyclone filters still are but imperfectly adapted for the purpose of supplying thoroughly clean air for use in internal combustion engines because the dust passes into the hopper of the dust collector solely due to gravity, resulting in such filters being dependent in their operating efficiency on the position in which they are used and being rather demanding in their space requirements.

The instant invention eliminates these shortcomings in that at least one helical ledge on the inner surface of the filter housing wall is provided which is in the direction of rotation of the cyclone and extends the entire height of the wall from the region of the air intake to the bottom of the housing. In addition, between the inner edge of the ledge and the outer surface of a hollow filter extending into the filter housing, an unobstructed passageway is provided which opens into the dust collector pocket at the bottom of the filter housing, the pocket being provided with an ejection port. Thus, by means of this pocket which is in the area of the rapidly rotating air stream, the dust particles which are centrifuged to the outer housing wall are separated from the air stream and guided to the always open ejector port and expelled, whereby automatic cleaning of the filter housing is obtained.

Figure 2:
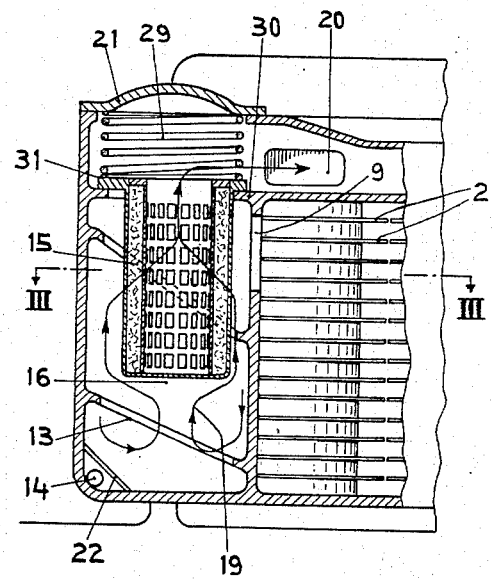
Figure 3:
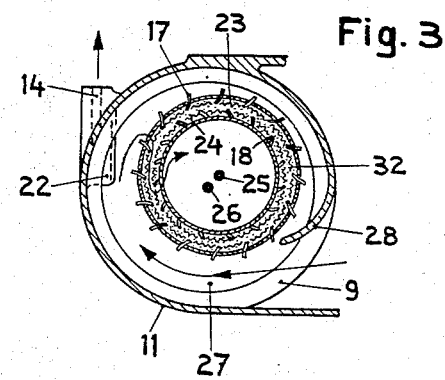

A more complete understanding of the above, and still other, objects of the invention may be obtained from the following detailed description when read in conjunction with the accompanying drawing in which Figure 1 shows an illustrative embodiment of the air filter of the instant invention as installed on an internal combustion engine as viewed from the top, partially in section and broken away; Figure 2 is a vertical section through the filter per se on an enlarged scale as compared to Figure 1; and Figure 3 is a horizontal section on line III—III of Figure 2.

The air cooled internal combustion engine of the diesel type has a plurality of cylinders 1, shown with their axes vertical for facility of illustration, having cooling ribs or fins 2 and a cooling air blower mechanism 3, driven from the engine shaft by means of a belt 4, the blower directing air drawn in from the external atmosphere into the air duct 5. The stream of air flowing through duct 5 is divided into two branches of which one, essentially for cooling, is diverted by the cooling vanes 6 of the engine oil cooler 7 within the duct to flow transversely across the cylinder cooling fins 2. The other branch of the air stream, which is to be used for combustion, flows longitudinally along the cool external wall 8 of the duct through the inlet opening 9 tangentially into the interior of the filter housing 10 of which the external cylindrical wall 11 is an integral continuation of duct wall 8. The stream of air is thereupon guided downwardly by means of the helical ledge 13 on the interior of the filter housing wall 11, whereby the dust particles are centrifugally driven outward against the cylindrical housing wall. From the lower end of the helical ledge 13 the dust particles flow into the dust receiving catcher 22, which extends inwardly from the filter housing wall, and are directed to the continuously open ejection port 14 and ejected therefrom into the external atmosphere with a small portion of the air due to their kinetic energy and the increased pressure prevailing within the housing. Preferably the dust ejection port 14 is tangential to the filter housing wall and in the direction of flow, as shown in Figures 2 and 3.

With such construction of the inventive filter, undesirable whirling up of the dust which has already reached the bottom of the housing is prevented. Tests have shown that with the filter construction of the invention, 90% to 95% of the dust originally contained in this portion of the air drawn in by the blower has been removed. The dust which has so been separated is either, as above stated, ejected into the external atmosphere, or is led by a pipe connected to the dust ejection port to some other convenient region, for example in railway locomotives, etc., to prevent sullying and contamination of other machinery or compartments.

Associated with this initial, and main, dust ejecting phase, the air which is rapidly and spirally rotating downwardly in the filter housing is diverted upwardly at the bottom, that is towards the cleansed air outlet port 20, and now flows, in accordance with the laws of vortices, upwardly in the direction of the arrows 19 in the same rotary direction, but at an increased angular velocity through the annular pasageway between the inner edge of the ledge 13 and the outer surface of the filter element 15, being prevented from entering the hollow interior of the filter element 15 in the direct path by the plate 16 which seals off the bottom of the filter element. Any dust particles which may be swept along by the upwardly moving air stream are thus again centrifuged out of the stream and thrown into the outer descending air eddy.

Hollow filter 15 comprises a fine mesh cylinder 32 having external covering plate 17 and internal covering plate 18 extending the full area, respectively, of its external and internal cylindrical surfaces. A plurality of ingress slits 23 are provided in the external plate 17 and have each a deflecting guide into the filter element per se extending tangentially from the plate initially in the direction of air flow and gradually curving to deflect the air passing through the slit substantially 180 degrees. Similarly, the internal cover plate 18 is provided with a plurality of slits 24 each of which has a deflecting guide of such contour as again to reverse the air passing from the filter element through a slit 24 into the hollow interior of the filter element substantially 180 degrees and so that the air leaving slit 24 leaves the latter slit substantially tangential the internal cover plate 18. Thus the individual streamlets of the upwardly moving inner eddy are diverted through substantially 180 degrees on entering the filter element but leave the element in the original direction of the eddy as the result of the second reversal of substantially 180 degrees. As the result of the sharp reversal of direction twice within the filter element of the air streamlets passing through it, substantially all the residual dust particles, quantitatively some 5% to 10% of the number originally contained in the air stream, are removed. It will be noted that thus the filter element 15, which may be oil soaked, is called upon to retain and hold back but a small amount of dust and hence requires but relatively infrequent removal for cleaning or replacement. The upper rim region of the outer plate 17 is formed to provide a shoulder 31 by which the filter assembly 17, 15, 18, 16 is supported on a convenient internally projecting ring 30 of the filter housing 10, positioned above the inlet opening 9 as not to interfere with the spiral ledge 13 which begins immediately below the ring 30. Thus, as shown in the drawings, the filter assembly 15 extends through the upper opening of the filter housing, is held in place by a spiral spring 29, and the upper opening is closed by the cover 21 acting against the spring. It will be noted that such construction permits of the ready removal, for replacement or cleaning, of the filter 15.

After passing into the interior of the hollow filter 15, the cleansed air flows axially the filter into the cleansed air outlet port 20, which in the illustrative embodiment is also the air inlet of the diesel engine. Preferably and as best shown in Figure 3, the longitudinal axis 25 of the filter element 15 is positioned eccentrically with respect to the longitudinal axis 26 of the filter housing 11 in such manner that the greatest distance between the cover plate 17 of filter element 15 and the wall 11 of the housing is at the region 27 closely adjacent the inlet port 9.

For engines operating at a constant R. P. M., optimum dust separation is obtained by suitably matching the sectional area of the air inlet port to the quantity of air to be passed therethrough. To readily adjust such area, a tongue 28 is provided in the housing at the inlet which may, for example, be bent into the air inlet to a greater or lesser degree as may be required.

By the eccentric disposition of the longitudinal axes as above stated, the resistance to passage of air through the filter of the invention is appreciably decreased, as detailed tests have conclusively shown.

In that, as has been mentioned above, the first phase of the present filter produces the removal of such a high percentage of the dust content of the air as supplied to the filter, it is obviously possible under certain conditions where the residual dust remaining after such primary removal is not deleterious in the particular use to which the cleansed air is to be put, to entirely omit the filter element 15 replacing it by an appropriately dimensioned tube having slits. In such event the dry cyclonic air filter of the invention requires no maintenance attention whatsoever as the removed dust is continually and automatically ejected from the filter housing as above described.

It will be noted that in the illustrative embodiment herein described the longitudinal axis of filter 15 is vertical as are the axes of the diesel engine cylinders. For engines with horizontally positioned cylinders, as also for such in which the cylinder axes are in V or W arrangement, the air filter of the invention may similarly be positioned with its axis parallel to the axis of one or more engine cylinders, that is horizontally or at any angle in space. The spatial position of the filter of the invention is wholly without effect on the operating efficiency of the present filter for there is no oil bath employed, and its operation depends primarily and in the main upon the kinetic motional energy of the cyclone.

The particular embodiment of the present invention hereinabove described is to be understood as by way of illustration only. Various modifications and changes will be obvious to the skilled worker in the art without departing from the spirit and scope of the invention.

What I claim is:

1. An air filter comprising a housing having a cylindrical wall and a bottom wall, an air intake port at the upper portion of the cylindrical wall and substantially tangential thereto, means for flowing air into the intake port, a continuously open dust ejection port in the bottom wall and substantially tangential to the cylindrical wall, a helical ledge extending along the inner surface of the cylindrical wall and adapted to guide blown admitted air in a whirl downwardly to the dust ejection port, a hollow cylindrical filter element of an outer diameter less than the inner diameter of the ledge to provide an unobstructed annular passageway between the element and the ledge and having its axis parallel to the axis of the cylindrical wall but displaced therefrom in such manner that the radial distance across the passageway is greatest at the sector of the housing adjacent to the air intake port, the filter element having an open top and a closed bottom spaced from the bottom wall whereby air moving in whirls upwardly from the bottom wall is deflected by the closed bottom of the element into the passageway so that the outer peripheral region of the upwardly moving whirls contacts the adjacent inner peripheral region of the downwardly moving air whirls, and a cleansed air output port cooperating with the open top of the filter element.

2. An air filter comprising a cylindrical housing wall, a bottom wall, an air intake port at the upper portion of the cylindrical wall, the region of the cylindrical wall forming a portion of the air intake port being flexible and adapted to adjust the cross-sectional area of the intake port, a continuously open dust ejection port in the bottom wall, a helical ledge extending along the inner surface of the cylindrical wall and adapted to guide blown admitted air downwardly to the dust ejection port, a hollow cylindrical filter element extending axially within the central upper region of the housing in cooperative relation to the intake port, the outer diameter of the filter element being such as to provide an annular unobstructed pasageway between the element and the ledge, the element having an open top and a closed bottom spaced from the bottom wall, whereby air moving in whirls upwardly from the bottom wall is deflected by the closed bottom of the element into the passageway so that the outer peripheral region of the upwardly moving air whirls contacts the adjacent inner peripheral region of the downwardly moving air whirls, and a cleansed air output port cooperating with the open top.

3. An air filter comprising a housing having a cylindrical wall and a bottom wall, an air intake port at the upper end region of the cylindrical wall and substantially tangential thereto, a continuously open dust ejection port in the bottom wall at the cylindrical wall, a cylindrical helical ledge extending along the inner surface of the cylindrical wall and adapted to guide blown admitted air in a whirl downwardly to the dust ejection port, a cylindrical filter element extending axially within the central upper region of the housing in cooperative relation to the intake port, the filter element including an outer cylinder of a diameter less than the inner edge diameter of the ledge and forming with the ledge an annular unobstructed passageway, an inner cylinder coaxial with the outer cylinder and of a lesser diameter, a cylinder of fine mesh between the outer and inner cylinders, a plurality of longitudinally extending slits in each of the outer and inner cylinders, a deflector for each port of each plurality extending into the fine mesh cylinder and adapted to reverse the direction of flow of air into and from the fine mesh cylinder, an annular top closing the tops of the fine mesh and outer cylinders while leaving the inner cylinder top uncovered, and a plate closing the bottoms of the inner, fine mesh and outer cylinders spaced from the bottom wall, whereby air reflected from the bottom wall and moving in whirls upwardly therefrom is deflected by the plate into the passageway so that the outer peripheral region of the upwardly moving air whirls contacts the inner peripheral region of the downwardly moving air whirls with the air in the passageway ultimately passing through the element, and a cleansed air output port adapted to receive the cleansed air from the element.

References Cited in the file of this patent

| Number | Name | Date |
|---|---|---|
| 601,355 | Paterson | Mar. 29, 1898 |
| 1,175,948 | French | Mar. 21, 1916 |
| 1,264,263 | Brassert | Apr. 30, 1918 |
| 1,405,399 | Donaldson | Feb. 7, 1922 |
| 1,505,744 | Stebbins | Aug. 19, 1924 |
| 1,640,622 | Smith | Aug. 30, 1927 |
| 1,717,369 | Clements | June 18, 1929 |
| 1,771,880 | Dunn | July 29, 1930 |
| 2,080,146 | McCoy | May 11, 1937 |
| 2,170,074 | Hewitt | Aug. 22, 1939 |
| 2,441,631 | Hills | May 18, 1948 |
| 2,595,175 | Sonderegger | Apr. 29, 1952 |

FOREIGN PATENTS

| Number | Country | Date |
|---|---|---|
| 219,481 | Switzerland | May 16, 1942 |
| 247,221 | Switzerland | Nov. 17, 1947 |